Aug. 2, 1960 J. T. WARKOCZEWSKI 2,947,446
CORE DROPPING DEVICE
Filed Dec. 8, 1958
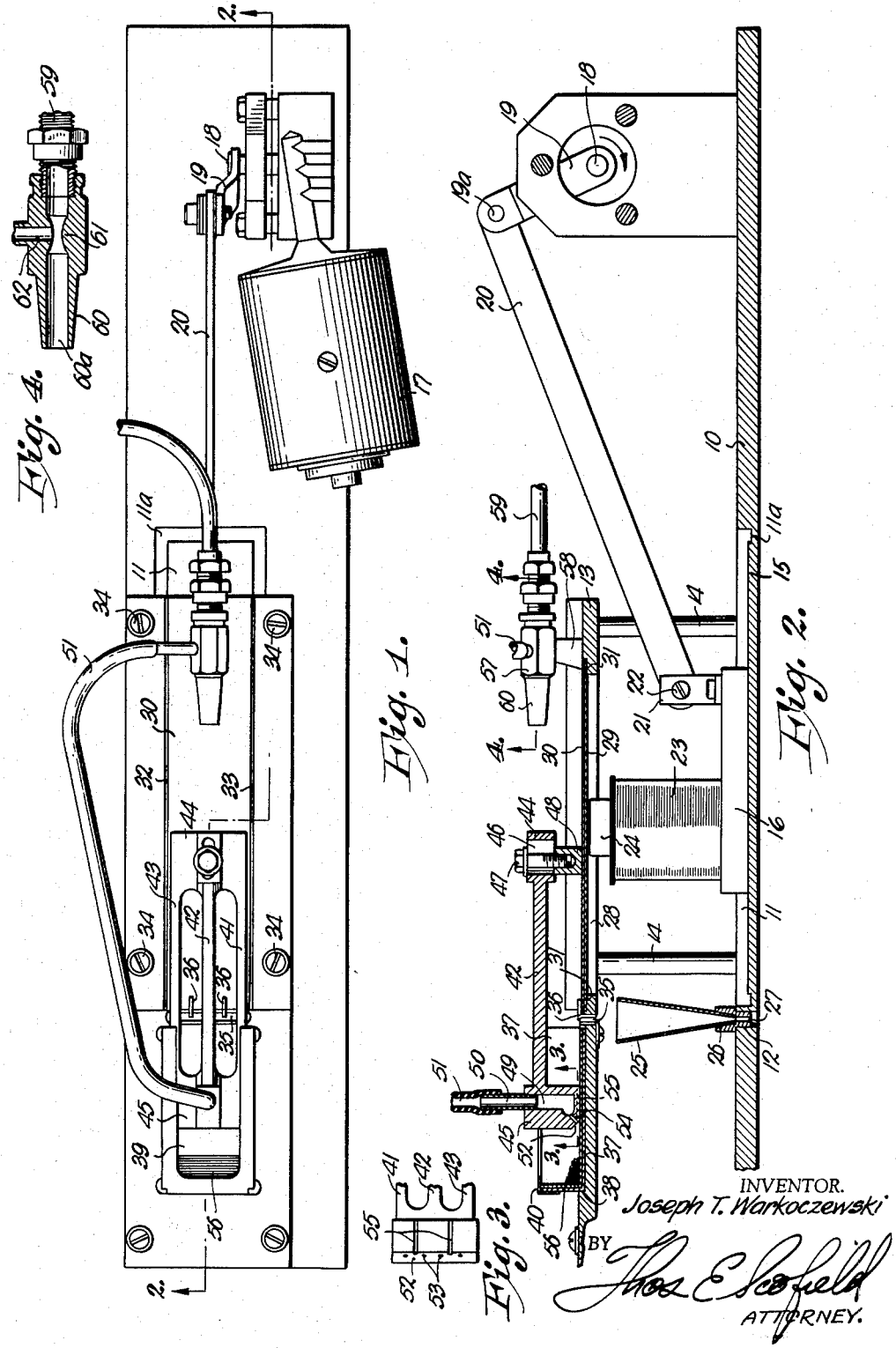
INVENTOR.
Joseph T. Warkoczewski
BY
Thos E Scofield
ATTORNEY.

United States Patent Office 2,947,446
Patented Aug. 2, 1960

2,947,446
CORE DROPPING DEVICE

Joseph T. Warkoczewski, Kansas City, Mo., assignor to Gustin-Bacon Manufacturing Company, a corporation of Missouri Filed Dec. 8, 1958, Ser. No. 778,897
9 Claims. (Cl. 221—211)

This invention relates to devices for feeding mold cores to mold core shearing devices and refers more particularly to a mold core pick-up and dropping device for selecting a single, frangible, fine diameter mold core from a stack of such cores, moving it to a feeding slot and dropping it therethrough, said operations conducting both automatically and continuously.

In my application Serial No. 721,491, filed March 14, 1958, entitled "Method and Apparatus for Forming Finely Perforated Rings," I have disclosed a process and apparatus for centrifugally casting finely perforated metal rings. This process and apparatus employs a multitude of very fine diameter mold cores to form the holes in the metal rings produced by the casting process. As disclosed in my application Serial No. 778,896, entitled "Mold Core Shearing Device," filed December 8, 1958, it is necessary to shear the cores to a predetermined length before inserting them in the mold. However, due to the delicacy and frangibility of these cores (typically a graphite and clay mixture analogous to a pencil "lead"), it is not possible to simultaneously shear a plurality of them without excessive and uneconomical breakage. Therefore, it is necessary to shear a single core at a time. Since the latter procedure is required, it then becomes necessary to provide mechanisms and devices for automatically feeding a single such frangible, fine diameter mold core to the shearing device at a time, accurately and without breaking or damaging the core in any way.

Many difficulties are found in providing such a process. In the first place, uniform, precise and dependable pick-up of a single core from a semi-ordered stacked pile of the same is required. Secondly, the pile of cores is constantly diminishing in size and the pick-up must be made from such varying size pile. Thirdly, each core picked up must be moved to a delivery passage of some sort and there released positively and accurately. Finally, since the cores are very susceptible to adherence or sticking to one another in the presence of water, oil, dust or graphite or clay debris from the cores themselves, this requires particular apparatus of great sensitivity, versatility and accuracy to accomplish the task.

Therefore, an object of my invention is to provide a core pick-up and dropping device for feeding core shearing machines which is accurate, precise and permits operation over a long period of time without clogging due to any conventional cause.

Another object of the invention is to provide such a core pick-up and dropping device which will not damage the cores, yet will consistently, accurately and continuously both pick up the cores and move them to the desired spot.

Another object of the invention is to provide such a core pick-up and dropping device which is relatively simple in construction, relatively simple, easy and cheap to manufacture, and wherein all of the parts are readily accessible to examination in operation and easily reached for replacement or repair.

Another object of the invention is to provide a core pick-up and dropping device which employs a vacuum pick-up for the cores which picks up only a single core, holds it securely while moving it to the discharge passage and, then reverses air flow through the vacuum system to blow off the core and any debris that may have been associated therewith, thus, also, keeping the vacuum system clean.

Another object of the invention is to provide a core pick-up and dropping device which continuously and accurately picks up a single core, time after time, from a constantly decreasing size pile of cores, no adjustment being required to the pick-up and dropping device during this pile size decrease.

Another object of the invention is to provide a core pick-up and dropping device which employs a core reservoir box that is removable from the machine for easy access to permit replenishing the core supply.

Another object of the invention is to provide a core pick-up and dropping device which employs a removable core reservoir box that is designed so as to permit replenishing the core supply by transferring semi-ordered stacked cores from a storage box to the core reservoir box and yet improve the order of the stacked cores.

Another object of the invention is to provide a core pick-up and dropping device which employs a vacuum pick-up for cores that reciprocates to and fro in a core reservoir box and during each cycle reorients and improves the order of core stacking in the reservoir box.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

Fig. 1 is a top view of the inventive core pick-up and dropping device.

Fig. 2 is a side, partly sectional view of the inventive core pick-up and dropping device of Fig. 1.

Fig. 3 is a view taken along the lines 3—3 of Fig. 2 in the direction of the arrows.

Fig. 4 is a view taken along the lines 4—4 of Fig. 2 in the direction of the arrows.

Referring to the drawings, at 10 is shown a lower shelf or platform having a recess 11 therein, as well as an opening 12 therethrough. Debris groove 11a is formed around the inner edge of recess 11. An upper shelf or platform 13 is spaced above the lower shelf 10 by posts 14.

The floor 15 of recess 11 is covered with a low friction plastic such as "Teflon." Float 16 is driven from left to right and vice versa in Fig. 2 by reciprocating prime mover 17 (Fig. 1) such as an automobile electric windshield wiper motor. Prime mover 17 drives shaft 18, which is connected to float 16 through arms 19 and 20, the latter hinged together at 19a and arm 20 connected to flange 21 on float 16 by bolt 22. Float 16 carries a conventional electromagnet therewith comprising a coil 23 and bar 24, the latter substantially abutting the underside of a portion of the upper shelf as to be described. The source of power for the coil is not shown but is conventional. Funnel 25 is mounted above opening 12 by fitting 26 which fits into the opening and provides a lesser diameter passage 27 therethrough, fed by the funnel.

A portion 28 of the underside of upper shelf 13 is hollow to make room for the motion of the bar 24 of the electromagnet. The upper portion of this hollowed out area is covered by a sheet 29 of nonmagnetic metallic such as brass topped by a sheet 30 of the low friction material or plastic such as "Teflon." Sheets 29 and 30 are fixedly received in grooves 31 in the top of platform 13. Longitudinal shelves 32 and 33, L-shaped in cross section, are fixed by screws 34 to the top surface of shelf 13 and bound the sides of the sheets 29 and 30. A transverse slot 35 is provided in the upper shelf 13 extending therethrough immediately above the funnel 25 of a width at least equal to the length of the cores to be dropped. A pair of pick-off fingers 36 are fixed to platform 13 and extend partly over the slot and above the level of the sheet 30. Core reservoir box 37 is fitted into recess 38 in the upper surface of platform 13 on the other side of slot 35 from sheet 30 and is low friction material or Teflon-lined as at 39. An open-centered removable top 40 is provided for the end and side edges of the Teflon box which is open ended adjacent the slot 35. The Teflon lining 39 of the box is at the same level and parallel to sheet 30.

A core pick-up slide is provided to move back and forth in a longitudinal direction on the Teflon lining 39 and Teflon sheet 30. A light framework of longitudinal aluminum members 41, 42 and 43 join an aspirator flow actuator member 44 to the right in Figs. 1 and 2 to the core pick-up head 45 to the left in the figures. A slot 46 is provided in the former to permit engagement of a bolt 47 with a magnetic block 48 on the under side of aspirator actuator 44. The elongate slot 46 permits the longitudinal adjustment of block 48 relative to the actuator 44. A vacuum chamber 49 is formed within the pick-up head 45 to which tube 50 leads. Flexible connection 51 connects to the outer end of tube 50. Fig. 3 shows a view from the underside of the pick-up head showing the beveled front edge 52 with the plurality of vacuum openings 53 therein. Passages 54 connect the vacuum chamber 49 with the openings 53. A pair of grooves 55 are formed in the underside of the pick-up head 45 to match the pick-off fingers 36 whereby they will pass through the grooves and at least slightly past the beveled front edge 52 to disengage any picked up core therefrom.

A stacked semi-ordered pile 56 of cores is shown in the corner of the core box 37 with the cores lying transverse to the shelf 13. The purpose of the entire assembly is to translate the pick-up head 45 into the stacked pile of cores in such manner that a single core (not more than one) will be invariably picked up by the vacuum orifices 53 whereby the pick-up head may be moved rearwardly to the slot 35 where the core is to be dropped into the slot and funnel 25 and the pick-up head freed from all debris, thence to return for a second core pick-up.

Aspirator 57 is fixed to the upper shelf 13 by support 58 and performs two functions. In the first place, a flow of air through flowline 59 and out nozzle 60 draws a vacuum on flowline 51 which is attached to tube 50 of the pick-up head 45. A cross-sectional view of the aspirator is shown in Fig. 4 with a venturi section 61 of the aspirator head 57 being joined by flowline 62 which is connected to flexible flowline 51. The nozzle 60 has a broad opening 60a (Fig. 4), whereby flange 44 of the aspirator shut off will abut and close off said opening when the slide has been moved to its position furthest to the right in Figs. 1 and 2. Closing of the opening 60a will cause the flow of air to reverse, as it were, and flow into line 62 and flexible line 51 whereby to cause a puff of air to pass into the vacuum chamber 49, out passages 54 and thus aid in both releasing the picked up core over the slot 35 and freeing the openings 53 of any debris, dust, graphite, fragments, etc. which may have been picked up in the transverse across the low friction sheet 39.

In operation, prime mover 17 drives float 16 in to and fro motion carrying the electromagnet and bar 24 under the recess 28. On the upper shelf, the magnetic block 48 follows the bar 24 in its to and fro motion, thus reciprocating the slide to and from the pile of cores to be picked up and to and from the release slot 35. The float 16 is so arranged as always to overshoot the maximum distance the pick-up head could go into the core retainer box 37 whereby, no matter how small the pile of cores 56 may grow, the pick-up head will pass to and into the pile to pick up the cores, one at a time. When the core pile is large, the overshoot is large, when the core pile is small, the overshoot is less. The return stroke of float 16 draws block 48 to the rear where the flange 44 shuts off the aspirator nozzle 60 to clean out the openings 53 and ejects the core immediately over the slot 35. The operation of the entire device may be continuous with extra cores added periodically between strokes. The strength of the electromagnet is no greater than required only to cause movement of the slide. When the slide meets the resistance of the stacked pile of cores the magnetic coupling between the electromagnet and slide is broken. Then the electromagnet on the float will "overshoot" and leave the slide stationary until the back stroke when the slide is caused to move in the return direction with the core it has picked up.

From the foregoing it will be seen that this invention is one well adapted to attain all of the ends and objects hereinabove set forth together with other advantages which are inherent to the methods and apparatus.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described my invention I claim:

1. A frame comprising a lower shelf and an upper shelf mounted thereover in substantially parallel relationship, a core reservoir box on said upper shelf open on one side thereof, said box disposed with its length substantially parallel to the lengths of the shelves and adapted to receive cores in a pile positioned transversely of said upper shelf and box, a transverse slot in said shelf adjacent the open side of said box, means below said slot for receiving cores dropped therethrough, a core pick-up slide on said upper shelf adapted to move to and fro longitudinally thereof in a direction substantially normal to the lay of the cores in the reservoir box, a core pick-up head on the front of said slide adapted to contact cores in said core box with its front side, at least one vacuum orifice in the lower front edge of said pick-up head, a vacuum cavity and at least one passage in said pick-up head connected to said orifice whereby to pull a vacuum at the lower front of said head, a vacuum connection to said cavity operable to alternately pull and release a vacuum, and means for translating said slide to and fro on said upper shelf to move said head from said core pile in said box to said slot and return.

2. A device as in claim 1 wherein the lower front end of the pick-up head is beveled.

3. A device as in claim 1 including pick-off fingers in the shelf at the slot and matching grooves in the pick-up head.

4. A device as in claim 1 wherein the vacuum connection to the head includes an aspirator as a source of vacuum, and the exhaust of the aspirator is closed by the slide when the head reaches the slot whereby to release the vacuum in the head to release the core picked up thereby and cause a positive puff of air through said orifices to clean debris therefrom.

5. A device as in claim 1 wherein the means to receive cores comprises a funnel feeding the cores through an opening in the lower shelf.

6. A device as in claim 1 wherein the upper shelf is covered with a low-friction material where said slide moves.

7. A device as in claim 1 wherein the translating means comprises a magnetic coupling between the slide on the upper shelf and a driven second slide on the lower shelf.

8. A device as in claim 7 wherein the lower shelf has low friction material thereon where said second slide moves.

9. A device as in claim 2 including a plurality of vacuum orifices in the beveled edge of the pick-up head.

References Cited in the file of this patent
UNITED STATES PATENTS

| | | |
|---|---|---|
| 2,138,662 | Neumair | Nov. 29, 1938 |
| 2,183,606 | Day | Dec. 19, 1939 |
| 2,198,976 | Rober | Apr. 30, 1940 |
| 2,546,838 | Tasche | Mar. 27, 1951 |